Aug. 13, 1968  H. R. WOOD  3,396,470
APPARATUS FOR MEASURING FREEBOARD IN CHOPPY WATER
Filed July 26, 1967  2 Sheets-Sheet 1
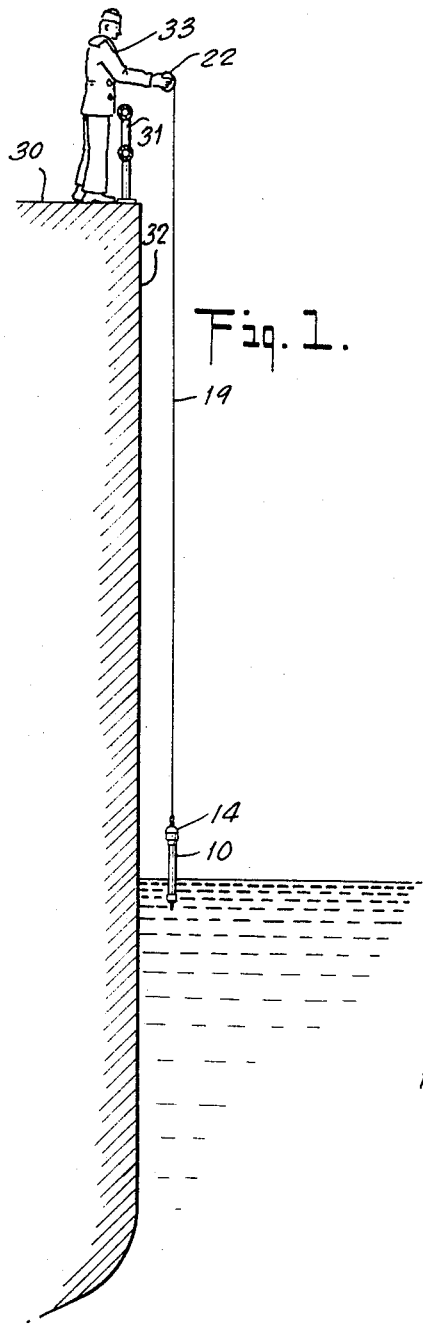
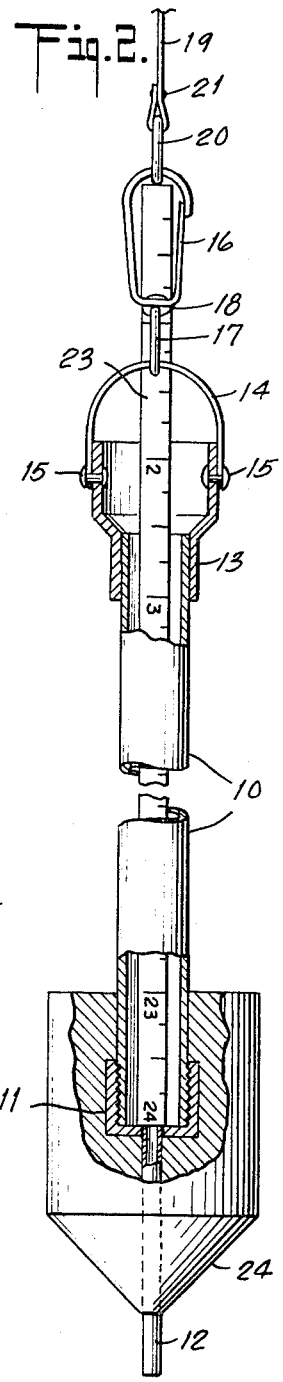
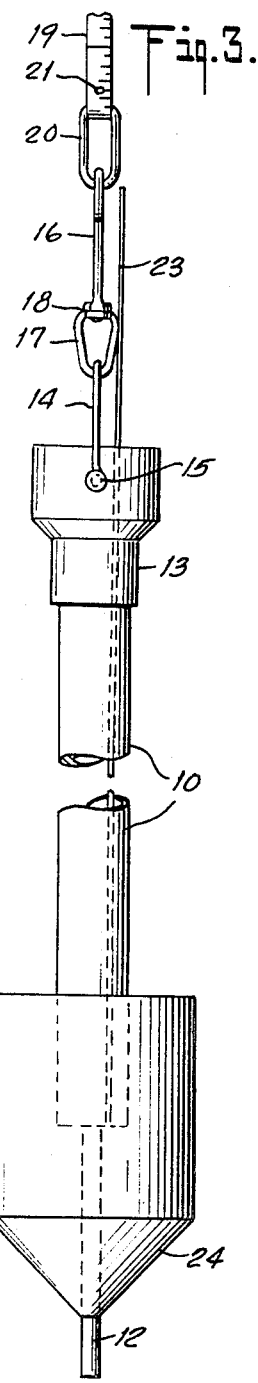
INVENTOR.
HAROLD R. WOOD
BY Krazinski & Nolan
ATTORNEYS Aug. 13, 1968  H. R. WOOD  3,396,470
APPARATUS FOR MEASURING FREEBOARD IN CHOPPY WATER
Filed July 26, 1967  2 Sheets-Sheet 2
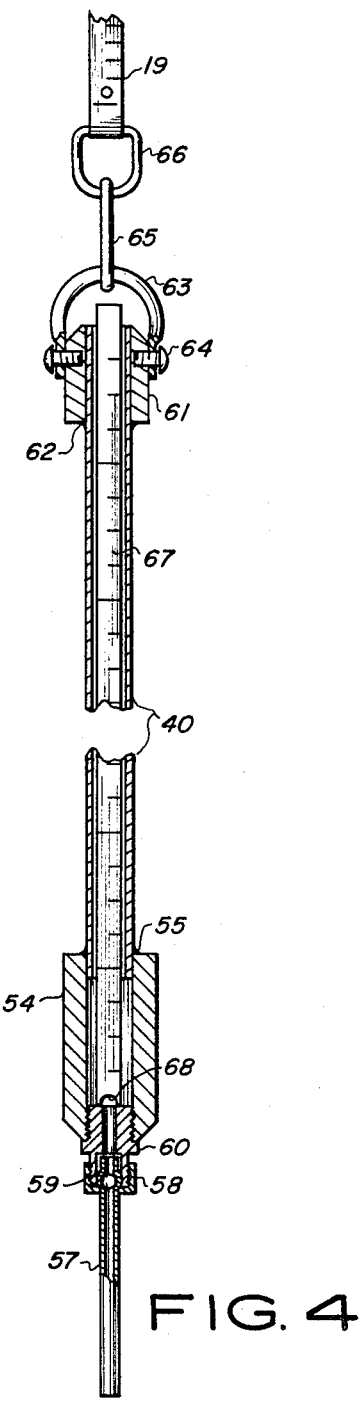
FIG. 4
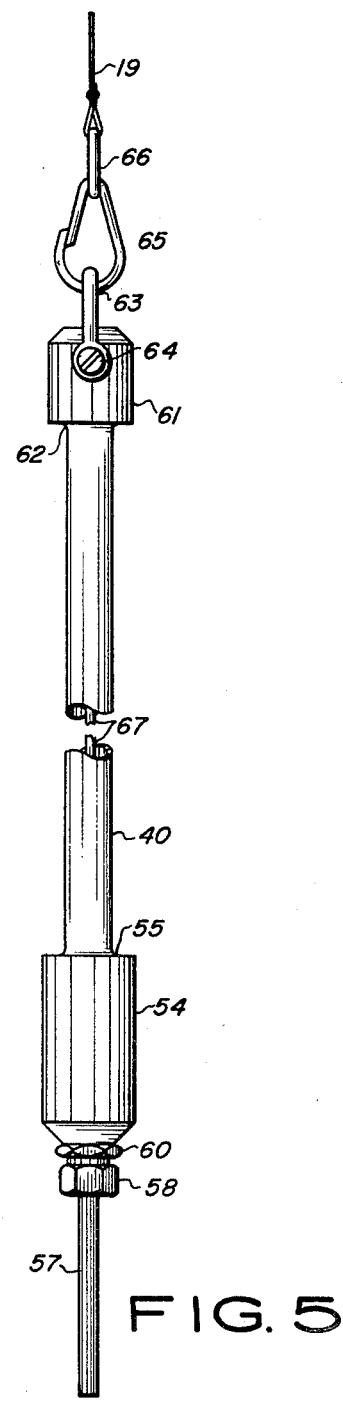
FIG. 5
INVENTOR.
HAROLD R. WOOD
BY 
ATTORNEY United States Patent Office 3,396,470
Patented Aug. 13, 1968

3,396,470
APPARATUS FOR MEASURING FREEBOARD
IN CHOPPY WATER
Harold R. Wood, 537 Pala Ave.,
San Leandro, Calif. 94577
Continuation-in-part of application Ser. No. 492,678,
Oct. 4, 1965. This application July 26, 1967, Ser.
No. 659,838
3 Claims. (Cl. 33—126.5)

ABSTRACT OF THE DISCLOSURE

Freeboard measuring apparatus adapted for use in choppy seawater and including a rigid tube which is weighted at its bottom end, a cap attached to the bottom end of the tube and carrying a pipe for the passage of seawater into the tube, a bail connector secured to the top of the tube and provided with a bail which is removably coupled to a graduated flexible tape through the medium of a snap hook. A graduated dip stick is positioned in the tube and extends from the bottom of the tube to the flexible tape. The tube, cap, pipe, bail connector, bail and dip stick are all made of a suitable noncorrosive material, preferably copper or an appropriate copper alloy.

Cross-reference to related application

This application is a continuation-in-part of my application Ser. No. 492,678, filed Oct. 4, 1965, now abandoned.

Background of the invention

This invention relates to the measurement of freeboard and more particularly to a method and apparatus for measuring freeboard in choppy water.

A relatively accurate determination between the water line and the freeboard deck of a ship is essential in the efficient loading of ships and particularly cargo vessels. But accurate measurement of the freeboard of a vessel is well nigh impossible in choppy water.

Summary of the invention

In accordance with this invention, freeboard is measured quickly and accurately. The measurement involves containing a moiety of the seawater substantially free of choppiness within a confined area at the same average level as the choppy seawater and measuring the distance from the level of the seawater in the confined area to a predetermined point in the air below the level of the freeboard deck and measuring the distance between that predetermined point and the level of the freeboard deck. The sum of the two measurements gives the freeboard of the vessel at the time of measurement. Desirably, the freeboard is measured by an apparatus comprising a tube having an opening for the entry of seawater therein, a removable graduated scale contained in the tube and a graduated flexible tape attached to the top of the tube. One embodiment of such a device comprises a rigid copper tube, a copper tube cap attached to the bottom end of the tube and having a copper pipe passing therethrough and adopted for the passage of seawater into the tube, a copper bail connector attached to the top of the rigid tube, a bail connected to the bail connector, a graduated flexible tape, a snap hook attached to the bail and the flexible tape and a graduated dip stick inserted in the tube and extending from the bottom of the tube to the beginning of the flexible tape. Desirably, the dip stick has coated throughout the length of its graduations a water indicator. A lead weight conveniently surrounds the bottom of the tube in order to insure its immersion in the seawater.

The graduated flexible tape attached to the top of the tube is let down from the deck to which measurements are to be made to the seawater. The seawater enters the opening of the tube and, although the sea adjacent to the ship may be choppy, the water in the tube has substantially no turbulence. The distance of the freeboard deck to the top of the tube is indicated by the graduations on the flexible tape. The flexible tape is then pulled back, desirably by means of a reel to which an end thereof is attached, such as the reel of a conventional tape measure. The distance between the beginning of the flexible tape and the level of the water, as indicated by a water indicator on the removable graduated scale, is shown on the graduations on that scale. The sum of the two distances gives the freeboard of the vessel.

The objectives, advantages and features of the present invention may be readily understood by persons trained in the art from the following detailed description taken in conjunction with the accompanying drawings which respectively describe and illustrate the preferred embodiments of the invention.

Brief description of the drawings

In the drawings wherein like reference numerals denote corresponding parts in the several views:

FIG. 1 is a sketch showing the utilization and the immersion of a portion of a device of this invention in seawater;

FIG. 2 is a front view, partially in central vertical cross section, of an embodiment of a device of this invention;

FIG. 3 is a side view of the device shown in FIG. 2;

FIG. 4 is a front view, partially in central vertical cross section, of another embodiment of a device of this invention; and FIG. 5 is a side view of the device shown in FIG. 4.

Description of the preferred embodiments

In FIGS. 2 and 3 of the drawings, a rigid copper tube 10 has attached to its bottom end a copper tube cap 11 through which a copper tube or pipe 12 passes. The pipe 12 is adapted for the passage of seawater into the tube 10. A copper bail connector 13 is fixedly attached to the top of the copper tube 10. A copper bail 14 is connected to the bail connector 13 by means of bolts 15. A snap hook device comprising a snap hook 16, attachment ring 17 and bolt 18 connects the bail 14 with the graduated flexible tape 19 through a ring 20 of the graduated flexible tape 19. Conveniently, the flexible tape may be wound on a reel 22, as shown in FIG. 1. Preferably, the graduated flexible tape device comprising the tape 19, the ring 20 and the reel 22 is a conventional roll-up metallic tape measure. A graduated dip stick 23 is inserted in the tube 10. Conveniently, the top end of the graduated dip stick 23, coincides with the end of the ring 20 of the graduated flexible tape 19 so that when the device for measuring choppy water, shown in FIGS. 2 and 3, is in operation, the dry area of the graduated dip stick 23 indicates the distance between the bottom end of the graduated flexible tape 19 and the average level of the choppy seawater. Desirably, a cast lead weight member 24 surrounds the end of the tube 10 and extends to about three-quarters of the length of the tube 12.

The utilization of the apparatus shown in FIGS. 2 and 3 and the method of this invention for the determination of freeboard is illustrated in FIG. 1. The measurement is conducted from the freeboard deck 30 of a ship having a guard rail 31 and a hull 32. A surveyor 33 lowers the tube 10, which is attached in the manner shown in FIGS. 2 and 3, to the graduated flexible tape 19 until at least six inches of the tube 10 is below the surface of the water and more if the water is very choppy. By employing an even foot mark at the freeboard deckline, calculations are made easier. The graduated flexible tape 19 is read at the deckline. The graduated flexible tape 19 is then pulled up and the dry area of the graduated dip stick 23 is measured and added to the reading of the graduated flexible tape. This addition gives the distance from the freeboard deckline to the true surface of the water or freeboard. In very choppy water, the tube 10 is lowered, desirably, well below the chop. Preferably, a water level indicator is coated throughout the length of the graduation of the dip stick 23. Examples of such water level indicators are blue or white chalk or certain chemicals which indicate a tell-tale color when immersed in water. Blue chalk has been found more effective than white chalk. By the utilization of a water indicator, the dry area of the graduated dip stick can be easily seen. The weight 24 should be sufficiently heavy to immerse the device in choppy seawater and yet be sufficiently light so that it will not break the flexible tape 19. Again, the tape 19 should be sufficiently strong so that, when the device is immersed, it will not break. Instead of copper, the device may be made in whole or part of other noncorrosive metals or suitable plastics, such as methylacrylate ester polymers.

Referring to the embodiment of the invention shown in FIGS. 4 and 5, a rigid, substantially non-corrosive tube 40 has attached to its bottom end a hollow non-corrosive weight member 54 which is desirably composed of stainless steel. The tube 40 is preferably made of Cupro Nickel containing 68.90% copper, 30.00% nickel, 0.60% manganese and 0.50% of iron having an approximate relative machineability of 20. The weight member 54 may be an Allegheny stainless No. 303 which has a maximum of 0.15% carbon, 2.00% manganese, 1.00% silicon, 17 to 19% chromium and 8 to 10% nickel. It also has a maximum of 0.60% molybdenum or zirconium. The weight member 54 is welded to the tube, as indicated at 55. A recommended brazing alloy used to weld or connect the tube 40 to the stainless steel weight member 54 is marketed in this country under the trade name "Easy-Flo." It has one of the lowest flow points of any known alloy capable of making high strength joints. It contains copper, zinc, cadmium and a medium percentage (50%) of silver. The melting point is 1160° F. (627° C.) and it is exceptionally fluid at 1175° F. (635° C.). It joins all ferrous and non-ferrous metals which melt at temperatures above its flow point and is particularly effective in joining dissimilar metals. The weight member 54 terminates at its bottom end in a tubular assemble to allow for the passage of water to the tube 40. This tubular assemble comprises a smaller diameter tube 57 and a tubular nut, such as the illustrated hexagonal tubular nut 58. A portion of the tube 57 has an enlarged diameter having a rounded outer surface 59. A portion of a nipple 60 is adopted to receive the enlarged portion of the tube 57 and is convex at its lower end to receive and form a fluid tight seal with the rounded enlarged portion of the tube 57. Likewise, the tubular nut 58 has a convex portion adopted to protect the rounded portion of the tube 57 and thereby hold that tube in a rigid position. Threads are provided in the weight member 54 to receive and engage the upper portion of the nipple 60.

A second hollow non-corrosive weight member 61 is telescopically positioned at the upper end of tube 40 and is welded thereto as indicated at 62. The material of weight member 61 and the brazing alloy of the weld 62 may be the same as or similar to weight member 54 and the alloy of weld 55. A bail 63 is secured at its ends to weight member 61 by screws 64. The bail 63 is connected to flexible tape 19 through the medium of a snap hook 65 and a ring 66. Desirably, the bail 63 is stainless steel such as 304 Allegheny stainless steel which contains a maximum of .08% carbon, 2% manganese, 1% silicon, 18 to 20% chromium and 8 to 11% nickel.

As is shown in FIG. 4, therein illustrated embodiment of the invention includes a dipped stick 67 which corresponds to earlier described dip stick 23. Preferably, the dip stick 67 is a methylmethacrylate plastic. One such plastic is that sold under the trademark "Plexiglas." Desirably, the plastic graduated dip stick 67 is sand blasted on one side to roughen the surface in order that chalk will adhere to it. Also the end of the dip stick adjacent the nipple is formed with an arcuate recess 68 to allow easy access of water to the tube 40.

It is evident from an examination of FIGS. 4 and 5, that the form of the invention shown therein operates in a manner similar to that of FIGS. 2 and 3.

What is claimed is:
1. Apparatus for measuring freeboard in choppy water comprising a rigid tube, a tube cap attached to the bottom end of said tube and having a pipe passing therethrough adapted for the passage of seawater into said tube, a bail connector attached to the top of said tube, a ball connected to the bail connector, a graduated flexible tape, a snap hook attached to said bail and said flexible tape, a graduated dip stick inserted in said tube and a lead weight surrounding the bottom portion of said tube.

2. Apparatus for measuring freeboard in choppy water comprising a rigid non-corrosive tube, a non-corrosive tube cap attached to the bottom end of said tube and having a non-corrosive pipe passing therethrough adapted for the passage of seawater into said tube, a non-corrosive bail connector attached to the top of said tube, a non-corrosive bail connected to the bail connector, a graduated flexible tape, a snap hook attached to said bail and said flexible tape, a graduated non-corrosive dip stick inserted in said tube and a lead weight surrounding the bottom portion of said tube.

3. Apparatus for measuring freeboard in choppy water comprising a rigid copper tube, a copper tube cap attached to the bottom end of said tube and having a copper pipe passing therethrough adapted for the passage of seawater into said tube, a copper bail connector attached to the top of said tube, a bail connected to the bail connector, a graduated flexible tape, a snap hook attached to said bail and said flexible tape, a graduated dip stick inserted in said tube, extending from the bottom of said tube to the beginning of said flexible tape and having a water indicator coated throughout the length of the graduations thereof, and a lead weight surrounding the bottom portion of said tube.

References Cited

UNITED STATES PATENTS

| 327,726 | 10/1885 | Schoening | 33—126.7 X |
| 617,451 | 7/1899 | Tanner | 33—300 |
| 1,478,288 | 12/1923 | MacGregor | 33—126.4 X |
| 1,947,592 | 2/1934 | Haller | 33—126.4 X |
| 2,006,301 | 6/1935 | Meyer | 33—126.4 X |
| 2,200,630 | 5/1940 | McCabe | 33—126.7 |
| 2,856,690 | 10/1958 | MacDonald | 33—126.4 |

FOREIGN PATENTS

| 225,673 | 12/1924 | Great Britain. |

WILLIAM D. MARTIN, JR., *Primary Examiner.*